US010583768B2

(12) United States Patent
Thorley

(10) Patent No.: US 10,583,768 B2
(45) Date of Patent: Mar. 10, 2020

(54) WATERCRAFT LAUNCH AND LOADING SYSTEMS AND METHODS

(71) Applicant: Boatjock LLC, Lindon, UT (US)

(72) Inventor: Paul Rollins Thorley, Lindon, UT (US)

(73) Assignee: Boatjock LLC, Lindon, UT (US)

( * ) Notice: Subject to any disclaimer, the term of this patent is extended or adjusted under 35 U.S.C. 154(b) by 172 days.

(21) Appl. No.: 15/943,038

(22) Filed: Apr. 2, 2018

(65) Prior Publication Data
US 2018/0281658 A1 Oct. 4, 2018

Related U.S. Application Data

(60) Provisional application No. 62/480,448, filed on Apr. 2, 2017.

(51) Int. Cl.
B60P 3/10 (2006.01)
B60P 1/00 (2006.01)

(52) U.S. Cl.
CPC ............ B60P 3/1066 (2013.01); B60P 1/00 (2013.01); B60P 3/1075 (2013.01)

(58) Field of Classification Search
CPC .......................... B60P 3/1066; B60P 3/1075
See application file for complete search history.

(56) References Cited

U.S. PATENT DOCUMENTS 3,447,815 A    6/1969   West
3,856,168 A *  12/1974  Mauck ................. B60P 3/1058
                                                    414/478
4,099,279 A    6/1978   Park
4,529,217 A    6/1985   Wood
4,623,161 A    11/1986  Sprague
4,715,768 A    12/1987  Capps
4,917,039 A    4/1990   Siero
5,299,903 A    4/1994   Kesselring
5,596,944 A    1/1997   Massie
6,598,896 B1   6/2003   Hyslop
6,616,166 B2   9/2003   Marchese
(Continued)

OTHER PUBLICATIONS

YouTube video entitled ""Z-Launch" watercraft launching cord"— (AaronBeshears). Published Apr. 12, 2012. Retrieved from Internet: <https://www.youtube.com/watch?v=cvMerl2m6b4>. (2 pages).
(Continued)

Primary Examiner — Kevin Hurley
(74) Attorney, Agent, or Firm — Thayne and Davis LLC; John P. Davis

(57) ABSTRACT

This disclosure relates to systems and methods for aiding in the launching and/or loading of a watercraft on a mobile trailer. Various embodiments provide for an aid system that may be removably installed without significant modifications to a trailer. In some embodiments, the aid system may include one or more guide straps that are elastic, at least in part, to facilitate the guiding and positioning of a watercraft and/or associated winch hook assembly during launching and/or loading operations. Further embodiments may ease launching operations by providing a certain measure of force propelling the watercraft from the mobile trailer into the water, and/or ease loading operations by positioning the winch hook assembly towards a rear of the mobile trailer during loading operations.

22 Claims, 7 Drawing Sheets

(56) References Cited

U.S. PATENT DOCUMENTS

| | | | |
|---|---|---|---|
| 6,904,861 B1* | 6/2005 | Warner | B60P 3/1033 |
| | | | 114/344 |
| 7,143,713 B1 | 12/2006 | Richardson et al. | |
| 7,156,036 B2 | 1/2007 | Seiple | |
| 7,179,041 B2 | 2/2007 | Ebbenga | |
| 7,347,157 B2* | 3/2008 | Seiple | B63C 3/02 |
| | | | 114/230.2 |
| 7,614,608 B1* | 11/2009 | Ebbenga | B66D 1/04 |
| | | | 254/278 |
| 8,495,964 B1* | 7/2013 | Ronald | B63B 21/20 |
| | | | 114/230.2 |
| 8,863,680 B2 | 10/2014 | Urciuoli | |
| 9,199,698 B2 | 12/2015 | Urciuoli | |
| 9,433,261 B1* | 9/2016 | Miles | A44B 13/0029 |
| 9,555,865 B2 | 1/2017 | Hansen | |
| 2002/0163213 A1 | 11/2002 | Ferguson | |
| 2010/0283224 A1 | 11/2010 | Allen | |

OTHER PUBLICATIONS

YouTube video entitled "Automatic Boat Loading 2009"—(RopeABoat). Published Jun. 6, 2009. Retrieved from Internet: <https://www.youtube.com/watch?v=7i-J3c7xon4>. (2 pages).

Website: Powerwinch Electric Boat Trailer Winches. Eastern Marine. Retrieved from Internet before Apr. 2, 2017: <https://www.easternmarine.com/POWERWINCH-Electric-Winches>. (2 pages).

Website: Launching and Hauling. Bosun Supplies Company. Retrieved from Internet before Apr. 2, 2017: <https://www.bosunsupplies.com/launching-and-hauling.html>. (3 pages).

YouTube video entitled "How to Launch Large Boat by Yourself with Stay Dry Boat Launcher"—(staydryboatlauncher). Published Sep. 23, 2013. Retrieved from Internet: <https://www.youtube.com/watch?v=LCEUp9gWvsA&t=7s>. (1 page).

Website: Launch and Retrieve Boat Latch. L & R. Retrieved from Internet before Apr. 2, 2017: <https://www.boatlatch.com>. (1 pages).

Website: Ramp-N-Clamp Automated Boat to Trailer Latch. Ramp-N-Clamp. Retrieved from Internet before Apr. 2, 2017: <http://www.ramp-n-clamp.com>. (1 pages).

Website: Drotto Automatic Boat Latch. Boat2Trailer. Retrieved from Internet before Apr. 2, 2017: <https://www.boat2trailerhookup.com/drotto-automatic-boat-latch>. (4 pages).

Website: Boatcatch Launch and Retrieve with Safety and Ease. Boatcatch. Retrieved from Internet before Apr. 2, 2017: <https://boatcatch.com>. (1 page).

Website: Balex Automatic Boat Loader—About the ABL25000. Balex. Retrieved from Internet before Apr. 2, 2017: <http://www.balexmarine.com/abl-2500>. (1 page).

YouTube video entitled "Drotto boat auto latch launch and load with ease"—(drotto). Published Oct. 15, 2013. Retrieved from Internet: <https://www.youtube.com/watch?v=giQ6_By4yIQ>. (1 page).

Website: Amazon—Launch N Load Watercraft Trailer Guidance System. Launch N Load. Retrieved from Internet before Apr. 2, 2017: <https://www.amazon.com/Launch-Watercraft-Trailer-Guidance-System/dp/B003WF1G8U>. (1 page).

YouTube video entitled "How to Launch a Boat yourself | Launch and Retrieve | Putting your boat onto a trailer | Boat Launch"—(caloundramarine). Published Dec. 18, 2013. Retrieved from Internet: <https://www.youtube.com/watch?v=gT_oHAqRXbM>. (2 pages).

Website: Trac Trailer Winches & Accessories. Trac. Retrieved from Internet before Apr. 2, 2017: <https://www.tracoutdoor.com/product-category/trailer-winches-accessories>. (1 page).

Website: Cabelas—Captain Hook Winch/Trailering Device. Cabelas. Retrieved from Internet before Apr. 2, 2017: (https://www.cabelas.com/product/Captain-Hook-Winch-Trailering-Device/738211.uts>. (1 page).

Website: Amazon—Winch Hooks Attaching Device. CDP. Retrieved from Internet before Apr. 2, 2017: <https://www.amazon.com/CDP-CH-1125-Winch-Attaching-Device/dp/B0002215JQ>. (1 page).

Website: YouTube Channel Page—ropeaboat. Retrieved from Internet before Apr. 2, 2017: <https://www.youtube.com/channel/UC8MzWdVKwf6RzpLxl-9zSUg>. (2 pages).

* cited by examiner

WATERCRAFT LAUNCH AND LOADING SYSTEMS AND METHODS

RELATED APPLICATIONS

This application claims the benefit of priority under 35 U.S.C. § 119(e) to U.S. Provisional Patent Application No. 62/480,448, filed Apr. 2, 2017, and entitled "Boat Launch and Load Aid," which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The present disclosure relates generally to watercraft accessories. More specifically, but not exclusively, the present disclosure relates to systems and methods for aiding in the launching and/or loading of a watercraft using a mobile trailer.

SUMMARY

Launching and/or loading a watercraft from and to a mobile trailer may be a relatively difficult and/or stressful experience. A watercraft, such as a boat, may be relatively less maneuverable at lower speeds and/or in shallow water, which may increase the difficulty of loading and/or launching operations. Non-ideal conditions including, for example, a crowded launch ramp, relatively inexperienced vehicle and/or watercraft drivers, high wind, rough water, and/or the like, may result in delays in and/or damage occurring from loading and/or launching operations.

Certain watercraft launching and/or loading aids require permanent modification and/or replacement of mobile trailer and/or watercraft components during installation and/or use. For example, certain aids require replacement of a mobile trailer winch and/or winch hook assembly with a specialized winch and/or winch hook assembly. Similarly, certain aids require replacement of the bow eye of a watercraft with a specialized bow eye. Such launching and/or loading aids may thus not be quickly and/or interchangeably used in connection with a variety of mobile trailers and/or associated winch, winch hook, and/or winch eye designs, and may further require relatively involved installation efforts.

Embodiments disclosed herein provide for a system for aiding in the launching and/or loading of a watercraft and associated methods. In certain embodiments, the aid system may be removably installed and/or may not necessarily require the replacement of mobile trailer components (e.g., a winch hook assembly) and/or watercraft components (e.g., a bow eye) with specialized components. Various embodiments of the disclosed aid system may, among other things, facilitate the alignment of a watercraft relative to a winch hook during launching and/or loading operations, ease launching operations by providing a certain measure of force propelling the watercraft from a mobile trailer into the water, and/or ease loading operations by positioning the winch hook assembly towards a rear of the mobile trailer during loading.

A watercraft loading and unloading system consistent with various disclosed embodiments may include a first guide strap, at least part of which may be elastic and/or otherwise stretchable and/or configured to provide a tension force when stretched. The first guide strap may include a first end that may be configured to be removably attached to a first rear connection point on a first side of a watercraft trailer. The first rear connection point may include, for example, one or more of a first guide post, a first guide roller, and/or a first guide rail on the first side of the watercraft trailer. The first end of the first guide strap may comprise a cinching mechanism, a loop, and/or a hook configured to removably attach the first guide strap to the first rear connection point.

A second end of the first guide strap may be configured to be removably attached to a winch hook assembly of the watercraft trailer and/or a portion thereof. For example, the second end of the first guide strap may comprise a hook configured to be removably attached to at least a portion of a winch hook and/or a winch strap loop of the winch hook assembly.

The watercraft loading and unloading system may further include a second guide strap, at least part of which may be elastic and/or otherwise stretchable and/or configured to provide a tension force when stretched. The second guide strap may include a first end that may be configured to be removably attached to a second rear connection point on a second side of a watercraft trailer. The second rear connection point may include, for example, one or more of a second guide post, a second guide roller, and/or a second guide rail on the second side of the watercraft trailer. The first end of the second guide strap may comprise a cinching mechanism, a loop, and/or a hook configured to removably attach the second guide strap to the second rear connection point.

A second end of the second guide strap may be configured to be removably attached to a winch hook assembly of the watercraft trailer and/or a portion thereof. For example, the second end of the second guide strap may comprise a hook configured to be removably attached to at least a portion of a winch hook and/or a winch strap loop of the winch hook assembly.

In various embodiments, the elastic and/or otherwise stretchable and/or springy portions of the first and second guide straps may comprise a rubber material, a latex rubber material, a polymer material, and/or the like, and may be solid, stranded, tubular, and/or any combination thereof. In further embodiments, the elastic portions may comprise one or more metal springs. In yet further embodiments, any suitable mechanism, material, and/or device for storing energy (e.g., a spring-loaded mechanism) may be used. In some embodiments, at least a portion of the first and second guide straps may be covered in a protective sheath. Portions of the protective sheath may include areas coated with a higher friction material and/or may have an associated protective bumper, float, and/or other visual indicator.

Further embodiments disclosed herein provide for a method of loading of a watercraft using a watercraft launching and loading aid system consistent with the various disclosed embodiments and/or installing such aid system on a mobile trailer.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
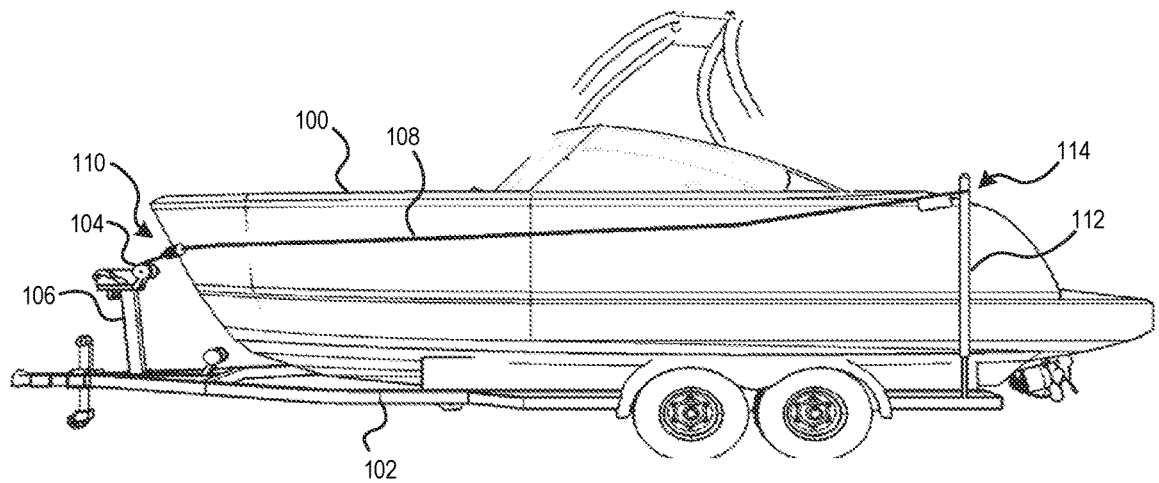
FIG. 1 illustrates a side view of a watercraft launching and loading aid system consistent with certain embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, where in some instances, like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Watercraft are often transported to and/or from the water on mobile trailers towed behind vehicles. Mobile watercraft trailers may include a frame with wheels and/or a hitch that attaches to the towing vehicle. The trailer frame may have support boards, which may be referred to as bunk boards, and/or rollers designed to support the weight of the watercraft when loaded on the trailer. The mobile trailer may further include guide poles, rails, and/or rollers to assist in the proper lateral positioning of the watercraft on the trailer. The watercraft may be secured to the mobile trailer with a safety chain and/or strap connected via a winch hook assembly to a bow eye and/or other suitable attachment point on the watercraft, and may be further secured to the sides and/or rear of the watercraft with additional chains and/or straps.

Embodiments of disclosed herein provide for a system for aiding in the launching and/or loading of a watercraft on a mobile trailer. In certain embodiments, the aid system may be removably installed and/or may not necessarily require the replacement of mobile trailer components (e.g., a winch hook assembly) and/or watercraft components (e.g., a bow eye) with specialized components. Embodiments of the disclosed aid system may, among other things, facilitate the alignment of a watercraft relative to a winch hook assembly of a mobile trailer during launching and/or loading operations, ease launching operations by providing a certain measure of force propelling the watercraft from the mobile trailer into the water, and/or ease loading operations by positioning the winch hook assembly towards a rear of the mobile trailer during loading.

FIG. 1 illustrates a side view of a watercraft launching and loading aid system consistent with certain embodiments of the present disclosure. As illustrated, a watercraft 100 may be transported and/or stored on a mobile trailer 102 that may be towed behind a vehicle (not shown). The watercraft 100 may comprise any suitable type of water and/or marine vessel including, without limitation, a ship, a boat, a hovercraft, a personal water craft, and/or the like, and may be propelled by any suitable mechanism (e.g., by sail, oar, and/or engine) and have any suitable number of hulls. For example, the watercraft 100 may comprise a prop-driven motor boat, a jet boat, a sail boat, a paddle boat, a drift boat, a canoe, a kayak, a catamaran and/or a trimaran, a jet ski, a raft, and/or the like.

As illustrated, the front of the trailer 102 may include a winch 104 secured to the trailer 102 via a winch stand 106. The winch 104 may include a crank handle and/or gears that may create a mechanical advantage while reeling in an associated winch strap. Although various embodiments disclosed herein are discussed in connection with a winch strap, it will be appreciated that further embodiments may use a cable, rope, and/or chain in lieu of and/or in addition to a strap. The end of the winch strap may be secured to a winch hook assembly 110 that includes a winch hook secured to the end of the winch strap that may configured to secure to an associated connection point on the watercraft 100 such as a bow eye.

In some embodiments, the winch 104 may not necessarily be designed with sufficient pulling force to overcome the friction of pulling the watercraft 100 onto the trailer 102 on dry ground. However, when the trailer 102 and/or watercraft 100 are submerged and/or partially submerged, the winch 104 may be capable of pulling the watercraft 100 into the proper position on the trailer 102. In further embodiments, the winch 104 may be capable of pulling the watercraft 100 onto the trailer 102 regardless of whether the trailer 102 and/or watercraft 100 are submerged and/or partially submerged.

Power loading and/or launching may refer to a watercraft loading and/or launching technique where a motor associated with the watercraft 100 is used to propel the watercraft 100 on and/or off its final loaded position on the trailer 102. Power loading and/or launching, however, may not be permitted at some boat ramps and/or in certain jurisdictions for a variety of reasons (e.g., erosion due to the thrust of the motor in close proximity to the boat ramp, increased likelihood of damage to a boat prop and/or boat ramp, etc.).

Watercraft may be relatively less maneuverable at lower speeds and/or in shallow water, which may increase the difficulty of non-powered loading and/or launching operations. Loading and/or launching operations may be further complicated by adverse weather conditions such as wind and/or rough water, which may result in damage to the watercraft 100 and/or trailer 102. Despite aiding in loading and/or launching operations, a winch 104 and/or associated strap may not necessarily be used by a user and/or used in a limited way due to the difficulty of extending the winch strap and securing and/or releasing the winch hook to/from the watercraft 100 (e.g., to/from the bow eye of the watercraft 100) when the watercraft 100 is behind a submerged and/or partially submerged trailer 102.

Embodiments of the disclosed aid system may, among other things, facilitate the alignment of the watercraft 100 relative to a winch hook assembly 110 of the mobile trailer 102 during launching and/or loading operations. In various embodiments, the disclosed aid system may include one or more guide straps (e.g., a first guide strap 108) that may be elastic and/or otherwise stretchable at least in part. The one or more guide straps may be removably secured to a winch hook assembly 110 at one end and to a rear connection point at the other end (e.g., a first rear connection point 114 associated with a first guide post 112). In certain embodiments, the system may include two guide straps, each guide strap removably secured to the winch hook assembly 110 and to associated rear connection points on each side of the trailer 100.

In certain embodiments, the guide straps may, among other things, provide a force to help launch the watercraft 100 from the trailer 102 and/or extend to winch strap towards the rear of the trailer 102 to ease subsequent loading operations. In further embodiments, the guide straps may operate to secure the watercraft 100 in a semi-launched and/or loaded position in deeper water to allow for final preparations before leaving the safety of the trailer 102 and/or winching the watercraft 100 into a final loaded position on the trailer 102. As discussed in more detail below, when the watercraft 100 is fully launched, the guide straps may hold the winch hook assembly 110 in an extended position towards the rear of the trailer 102 to allow for relatively easy manual attachment of the associated winch hook to a bow eye of the watercraft 100 by an operator during loading.

Figure 2:
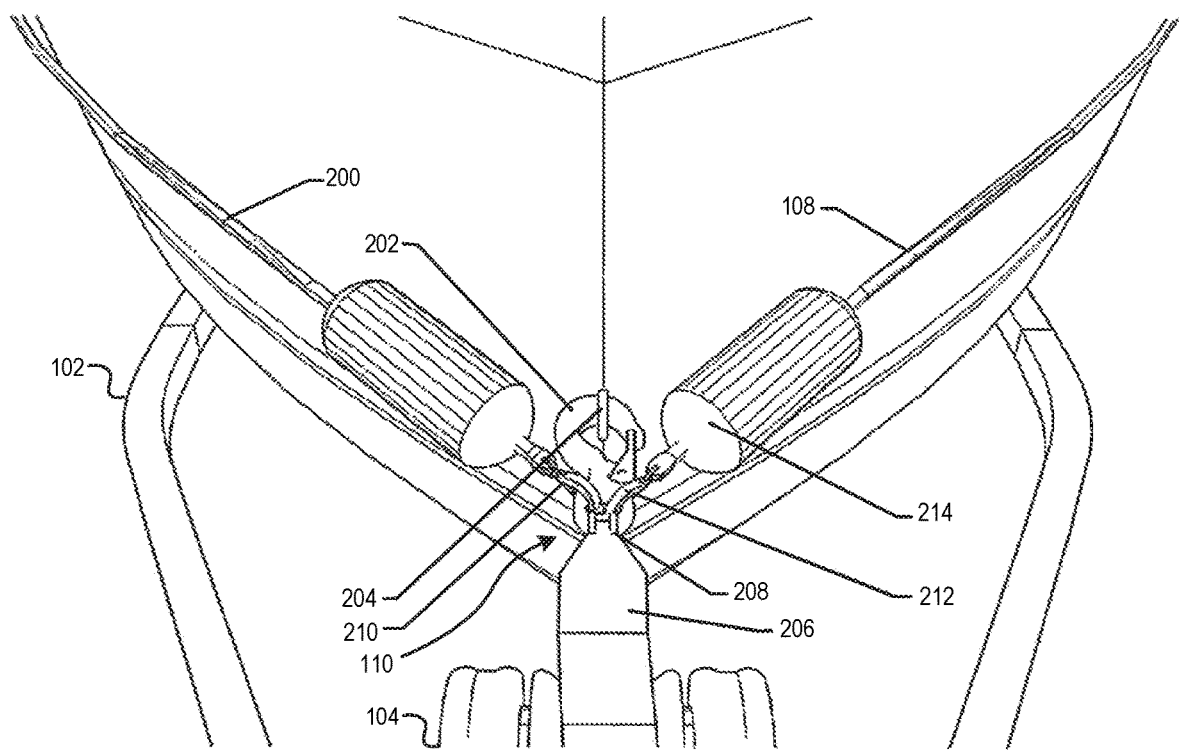
FIG. 2 illustrates a detailed perspective view of aspects of a watercraft launching and loading aid system consistent with certain embodiments of the present disclosure.

FIG. 2 illustrates a detailed perspective view of aspects of a watercraft launching and loading aid system consistent with certain embodiments of the present disclosure. As shown, the system may comprise a first guide strap 108 disposed of a first side of the watercraft and a second guide strap 200 disposed on a second side of the watercraft opposite the first side. First ends of the first guide strap 108 and the second guide strap 200 may be removably secured to associated rear connection points (not shown) of the trailer 102 using a variety of suitable attachment mechanisms. Second ends of the first guide strap 108 and the second guide strap 200 may be removably secured to the winch hook assembly 110.

As illustrated, the winch hook assembly 110 may comprise a winch hook 202 and a winch strap loop 208 configured to secure the winch hook 202 to a winch strap 206 associated with the winch 104. In certain embodiments, the winch strap loop 208 may comprise a sewn and/or welded loop at terminal end of the winch strap 206 configured to secure the winch hook 202 to the winch strap 206 (e.g., via a winch hook base and/or the like). The winch hook 202 may be configured to removably attach and/or otherwise engage with a bow eye 204 and/or other suitable mechanism associated with the watercraft to secure the watercraft to the trailer 102.

Although the winch hook assembly 110 illustrated in connection with FIG. 2 comprises a winch hook 202 secured to a sewn winch strap loop 208 at a terminal end of the winch strap 206 via a winch hook base, it will be appreciated in a variety of other assemblies may be used in connection with embodiments of the disclosed launching and/or loading system, and that any suitable design and/or configuration of winch hook assembly 110 may be used in connection with the disclosed systems and methods.

The second ends of the first guide strap 108 and second guide strap 200 may be configured to be removably secured to the winch hook assembly 110 and/or components thereof (e.g., winch hook 202 and/or winch strap loop 208) using a variety of suitable mechanisms. For example, as illustrated, the second end of the first guide strap 108 may be secured to a portion of the winch hook 202, such as the winch hook base, using a first hook 212. Similarly, the second end of the second guide strap 200 may be secured to a portion of the winch hook 202 using a second hook 210.

Figure 6:
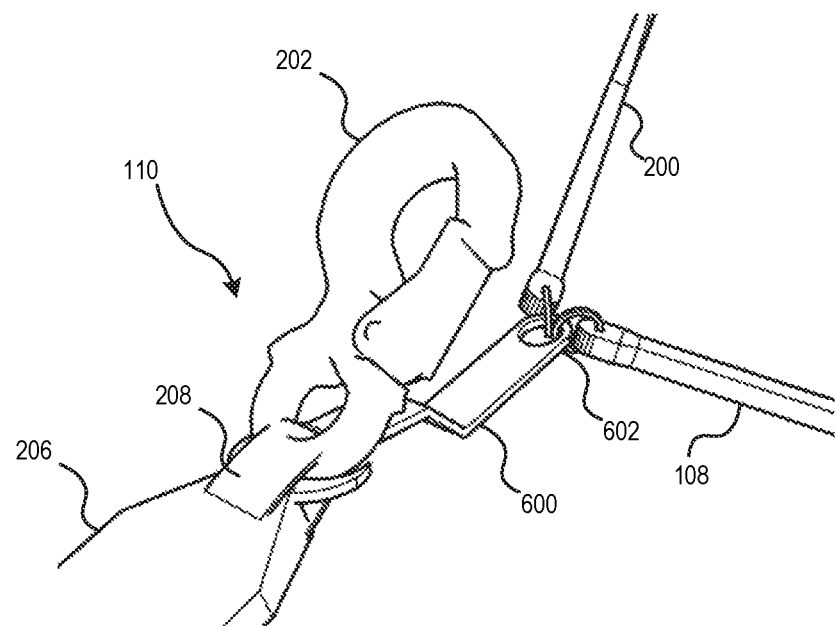
FIG. 6 illustrates a detailed view of an example of a secondary hook used to couple first and second guide straps to a winch strap loop of a winch hook assembly consistent with certain embodiments of the present disclosure.

In another example, the second ends of the first guide strap 108 and/or the second guide strap 200 may be secured to the winch strap loop 208 using hooks and/or other suitable mechanisms. In further embodiments, a secondary hook may be coupled to the winch strap loop 208, and the second ends of the first guide strap 108 and/or the second guide strap 200 may be secured to the secondary hook using any suitable mechanism, thereby securing the first guide strap 108 and the second guide strap 200 to the winch hook assembly 110. FIG. 6 illustrates an example of a secondary hook 600 used to couple first and second guide straps 108, 200 to a winch strap loop 208 of a winch hook assembly 110. For example, as illustrated, a secondary hook 600, which may be formed of metal, plastic, and/or any other suitable material and/or combination of materials, may be hooked through the winch strap loop 208, and the second ends of the first guide strap 108 and/or the second guide strap 200 may be removably secured to the secondary hook 600 at one or more associated connection points 602 using hooks, clasps, loops, and/or any other suitable mechanisms.

Referring back to FIG. 2, it will be appreciated that a variety of mechanisms may be used to attach the second ends of the first guide strap 108 and/or the second guide strap 200 to the winch hook assembly 110 and/or components thereof, and that any suitable mechanism may be used in connection with various aspects of the disclosed embodiments. For example, the second ends of the first guide strap 108 and/or the second guide strap 200 may be removably attached to the winch hook assembly 110 and/or components thereof using hooks, clasps, carabiners, hook and loop fasteners, loops, cinching mechanisms, and/or the like.

In various embodiments, the mechanisms for removably attaching the first ends of the first guide strap 108 and/or the second guide strap 200 to associated rear connection points of the trailer 102 may allow for adjustment of the length and/or tension of the first guide strap 108 and/or the second guide strap 200. For example, the mechanisms may allow for adjustment of the length and/or tension of the first guide strap 108 and/or the second guide strap 200 when the watercraft is in a loaded, semi-loaded, and/or partially-loaded position on the trailer 102. Similarly, the mechanism for removably attaching second ends of the first guide strap 108 and the second guide strap 200 to the winch hook assembly 110 and/or components thereof may allow for adjustment of the length and/or tension of the first guide strap 108 and/or the second guide strap 200. Allowing for the adjustment of the length and/or tension of the first guide strap 108 and/or the second guide strap 200 may facilitate integration of embodiments of the disclosed aid system in connection with a variety of trailer 102 and/or watercraft lengths, widths, and/or configurations.

The first guide strap 108 and/or the second guide strap 200 and/or portions thereof may comprise an elastic material. As used herein, the term elastic material in certain instances may refer to any material that may be capable of storing energy when tensioned. In various embodiments, the elastic portions of the first and second guide straps 108, 200 may comprise a rubber material, a latex rubber material, and/or a polymer material, and/or any other type of suitable elastic material. In some embodiments, the elastic portions of the first and second guide straps 108, 200 may comprise a stranded material, a solid material, a tubular material, a material having any other suitable cross-sectional profile, and/or any combination thereof. In further embodiments, the elastic portions of the first and second guide straps 108, 200 may comprise one or more metal springs. In yet further embodiments, the elastic portions of the first and second guide straps 108, 200 may comprise any suitable mechanism, material, and/or device for storing energy (e.g., a spring-loaded mechanism).

Figure 7:
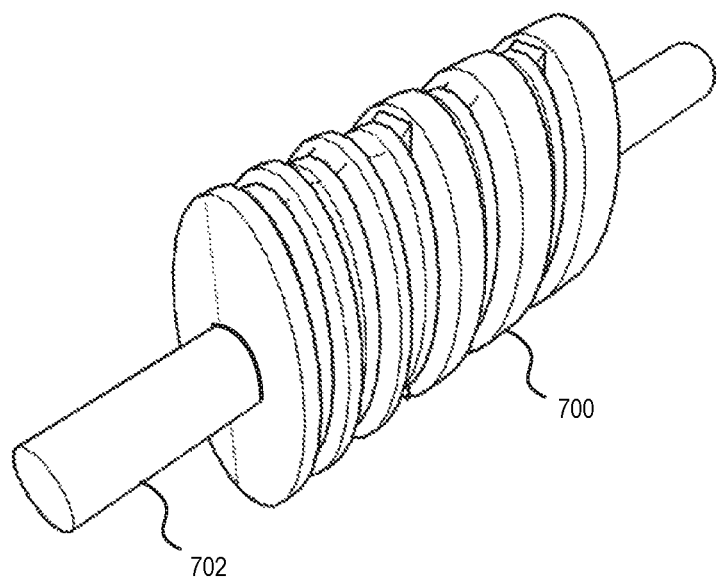
FIG. 7 illustrates a detailed view of a protective sheath consistent with certain embodiments of the present disclosure.

In some embodiments, at least a portion of the first and second guide straps 108, 200 may be covered in an associated protective sheath. In certain embodiments, the protective sheath may comprise a one or more of a nylon material (e.g., ballistic nylon), a canvas material, a neoprene material, and/or any other suitable type of material. For example, as shown in FIG. 7, in a retracted configuration (e.g., as may occur when the aid system is in an unloaded and/or semi-loaded configuration), the sheath 700 may be "bunched" up and/or otherwise compressed around an inner portion 702 of the first and second guide straps (e.g., an elastic portion). Referring back to FIG. 2, as the first and second guide straps 108, 200 are stretched (e.g., as may be the case in a loaded configuration), the sheath may be extended. In certain embodiments, the sheath may be sized such that when fully extended, the sheath may prevent the elastic material of the first and second guide straps 108, 200 from being over-stretched. In further embodiments, the sheaths associated with first and second guide straps 108, 200 may protect the inner elastic material from damage caused by abrasion, impact, ultraviolet light, and/or other environmental conditions.

In certain embodiments, portions of the first and/or second guide straps 108, 200 and/or associated protective sheaths may have areas that comprise a material having a higher coefficient of friction than other areas. For example, in some embodiments, portions of the first and/or second guide straps 108, 200 near the second ends may comprise a higher friction material configured to contact with areas of the bow of the watercraft and reduce slippage of the watercraft during launching and/or loading operations. Similarly, portions of the first and/or second guide straps 108, 200 near the first ends may comprise a higher friction material configured to contact with areas near the rear of watercraft and reduce slippage of the watercraft during launching and/or loading operations. The higher friction material may comprise, without limitation, a polymer material, a rubber and/or rubberized material, and/or any other suitable type of material.

In some embodiments, the first and/or second ends of the first and/or second guide straps 108, 200 may comprise one or more bumpers and/or floats 214. For example, as illustrated in FIG. 2, the second ends of the first and/or second guide straps 108, 200 may comprise floats 214, the terminal ends of which may comprise first and second hooks 212, 210 configured to secure the first and/or second guide straps 108, 200 to the winch hook assembly 110 via the floats 214. In certain embodiments, the floats 214 may be configured to protect the watercraft from damage (e.g., damage caused by contact with the winch 104) during launching and/or loading operations. In further embodiments, the floats 214 may function as a visual indicator (e.g., a colored visual indicator) of a location of the winch hook assembly 110 and/or may ensure that the winch hook assembly 110 floats on the top of the water during launching and/or loading operations in the event that the tension of the first and/or second guide straps 108, 200 does not keep the winch hook assembly 110 above the waterline.

Figure 5:
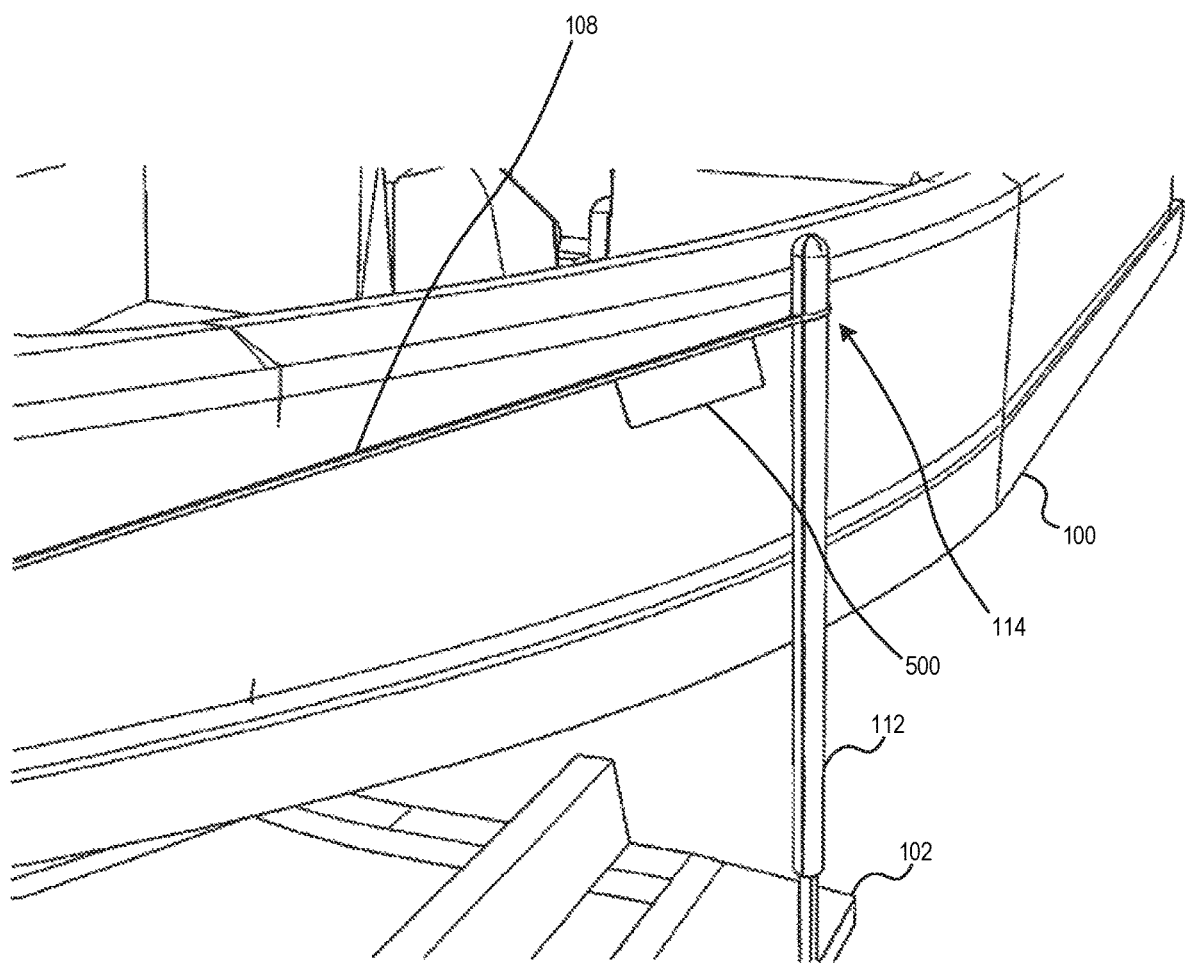
FIG. 5 illustrates a detailed perspective view of a rear connection point of a watercraft launching and loading aid system consistent with certain embodiments of the present disclosure.

The first ends of the first guide strap 108 and/or second guide strap 200 may be configured to be removably secured to rear connection points of the trailer 102 and/or components thereof using a variety of suitable mechanisms. For example, referring to FIG. 5, which illustrates a detailed perspective view of a rear connection point 114 of a watercraft launching and loading aid system consistent with certain embodiments of the present disclosure, the first end of the first guide strap 108 may be configured to removably attached to a rear connection point 114 located on an upper portion of a first guide post 112 on a first side of the trailer 102. In some embodiments, a flag 500 and/or other similar visual indicator may be attached to the first end of the first guide strap 108 and/or a first end of the second guide strap (not shown) to aid in locating and centering a watercraft 100 relative to the trailer 102 during launching and/or loading operations. Referring back to FIG. 2, the first end of the second guide strap 200 may be similarly configured to removably attach to a second rear connection point on a second side of the trailer 102 opposite of the first side.

It will be appreciated that a variety of mechanisms may be used to attach the first ends of the first guide strap 108 and/or the second guide strap 200 to the first and/or second rear connection points of the trailer and/or components thereof, and that any suitable mechanism may be used in connection with various aspects of the disclosed embodiments. In various embodiments, the first ends of the first guide strap 108 and/or the second guide strap 200 may be removably attached to the respective rear connection points and/or components thereof using hooks, clasps, carabiners, hook and loop fasteners, loops, cinching mechanisms, and/or the like.

Figure 9:
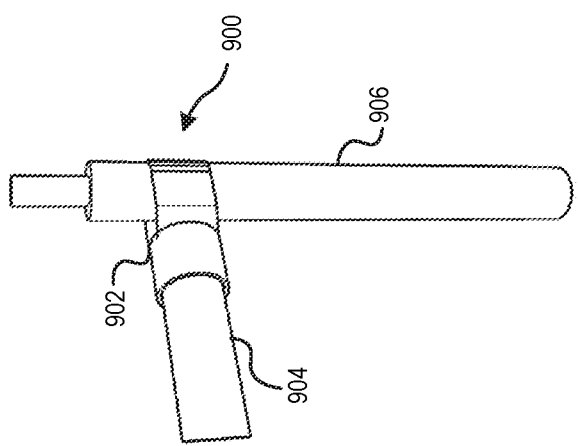
FIG. 9 illustrates a detailed side view of a guide strap that includes a cinching mechanism for removably attaching the guide strap to a rear connection point consistent with certain embodiments of the present disclosure.
Figure 8:
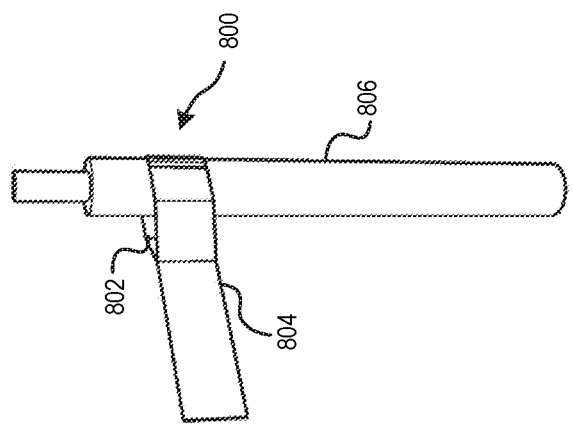
FIG. 8 illustrates a detailed side view of a guide strap that includes a loop for removably attaching the guide strap to a rear connection point consistent with certain embodiments of the present disclosure.

For example, as shown in FIG. 8, which illustrates a detailed side view of a guide post rear connection point 800 of a trailer consistent with certain embodiments of the present disclosure, a loop 802 (e.g., a sewn and/or welded loop) disposed at an end of a guide strap 804 may be secured around a guide post 806 of a trailer at a rear connection point 800. In another example, as shown in FIG. 9, which illustrates a detailed side view of a guide post rear connection point 900 of a trailer consistent with certain embodiments of the present disclosure, a cinching mechanism 902 disposed at an end of a guide strap 904 may be secured around a guide post 906 of a trailer at a rear connection point 900.

Figure 10:
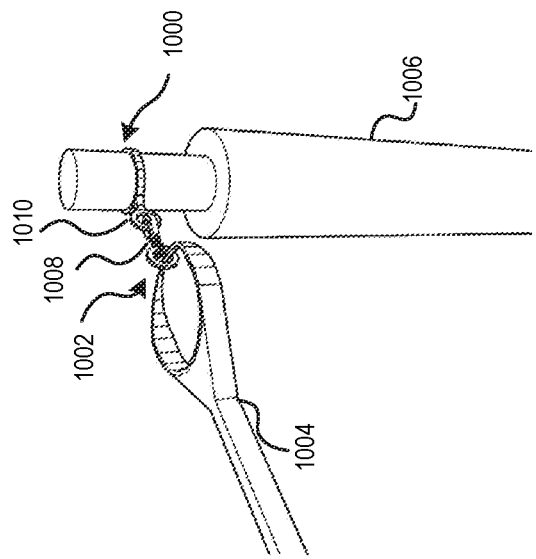
FIG. 10 illustrates a detailed side view of a guide strap that includes a hook and eyelet mechanism for removably attaching the guide strap to a rear connection point consistent with certain embodiments of the present disclosure.

In a yet further example, as shown in FIG. 10, which illustrates a detailed side view of a guide post rear connection point 1000 of a trailer consistent with certain embodiments of the present disclosure, a hook and eyelet mechanism 1002 disposed at an end of a guide strap 1004 may be secured around a guide post 1006 of a trailer at a rear connection point 1000. As shown, the end of the guide strap 1004 may comprise a hook 1008 (and/or a clasp, carabiner, and/or other assembly) configured to interface with an eyelet 1010 and/or another complementary mechanism secured to the guide post 1006 at a rear connection point 1000. In some embodiments, the eyelet 1010 and/or other mechanism may be removably installed on the trailer without modification to the trailer and/or the guide post 1006. In further embodiments, the eyelet 1010 and/or other mechanism may be installed through relatively minor modification of the trailer and/or the guide post 1006 (e.g., drilling a hole through the guide post 1006 and securing the eyelet 1010 through hole drilled in the guide post 1006).

Figure 13:
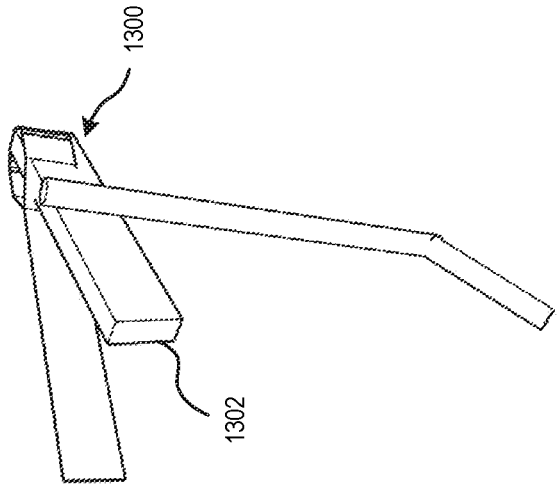
FIG. 13 illustrates a detailed perspective view of an example of a rear connection point on a guide rail of a trailer consistent with certain embodiments of the present disclosure.
Figure 12:
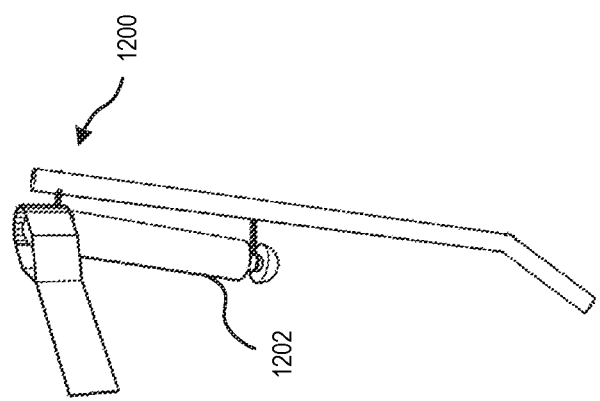
FIG. 12 illustrates a detailed perspective view of an example of a rear connection point on a guide roller of a trailer consistent with certain embodiments of the present disclosure.
Figure 11:
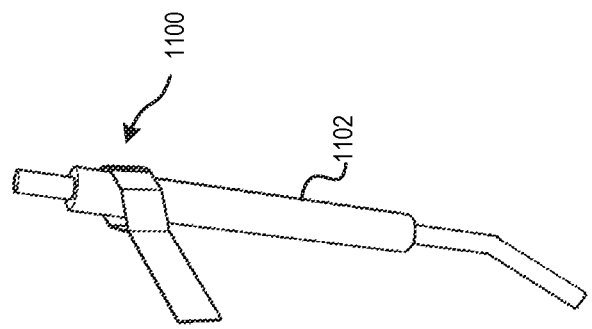
FIG. 11 illustrates a detailed perspective view of an example of a rear connection point on a guide post of a trailer consistent with certain embodiments of the present disclosure.

A variety of rear connection points may be used in connection with the disclosed embodiments. For example, as shown in FIG. 11, a rear connection point 1100 may be located on a guide post 1102 of a trailer. In another example, as shown in FIG. 12, a rear connection point 1200 may be located on a on a guide roller 1202 of a trailer. In a further example, as shown in FIG. 13, a rear connection point 1300 may be located on a on a guide rail 1302 of a trailer. It will be appreciated that a variety of rear connection points may be used to removably attach the second ends of the guide straps to the trailer and/or components thereof, and that any suitable connection points may be used in connection with various aspects of the disclosed embodiments.

Figure 3:
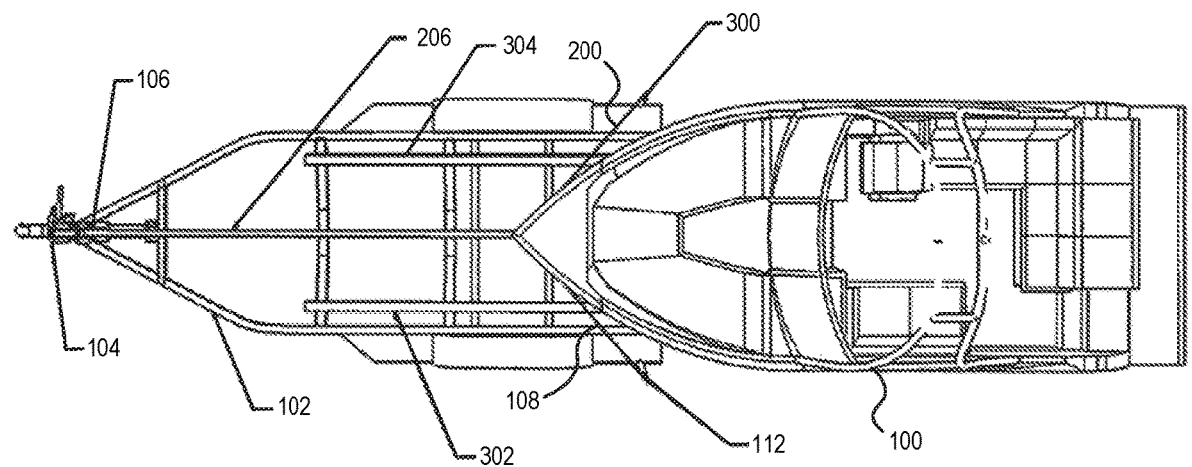
FIG. 3 illustrates top view of a watercraft in a semi-loaded position consistent with certain embodiments of the present disclosure.
Figure 4:
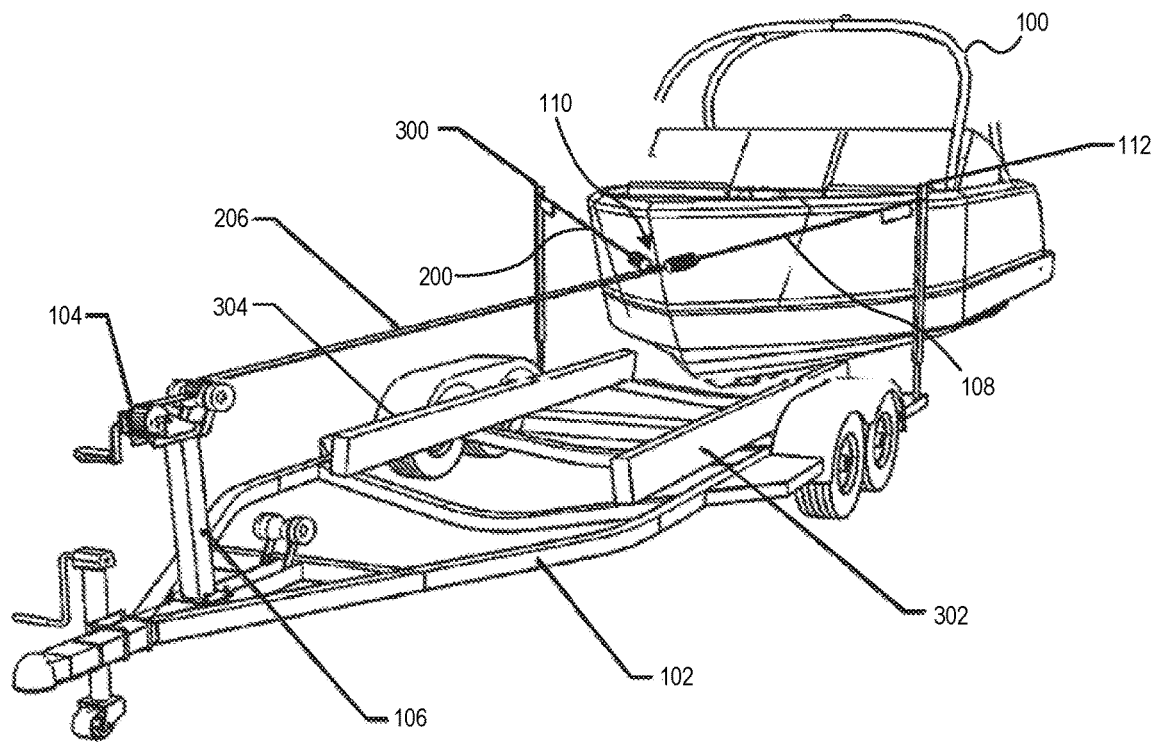
FIG. 4 illustrates a perspective view of a watercraft in a semi-loaded position consistent with certain embodiments of the present disclosure.

FIG. 3 illustrates top view of a watercraft 100 in a semi-loaded position on a trailer 102 consistent with certain embodiments of the present disclosure. Similarly, FIG. 4 illustrates a perspective view of a watercraft 100 in a semi-loaded position on a trailer 102 consistent with certain embodiments of the present disclosure. In certain embodiments, the disclosed aid system may be installed when a watercraft 100 and/or an associated trailer 102 is in a launch preparation area. For example, as described above, a first end of the first guide strap 108 may removably attached to a first rear connection point (e.g., a connection point on a first guide post 112) on the trailer 102 and a second end of the first guide strap 108 may be removably attached to the winch hook assembly 110. Similarly, a first end of the second guide strap 200 may be removably attached to a second rear connection point (e.g., a connection point on a second guide post 300) on the trailer 102 and a second end of the second guide strap 200 may be removably attached to the winch hook assembly 110.

In certain embodiments, the first and second guide straps 108, 200 may be installed such that when the watercraft 100 is in a loaded position, the straps 108, 200 are under tension. As discussed above, the length of the first and/or second straps 108, 200 may be adjusted to vary the amount of tension. In certain embodiments, the rear connection points may be selected such that the aid system may be configured to "catch" the watercraft 100 during a loading operation above and/or near the bow eye but not so high that the watercraft 100 may slip under the aid system during loading.

During a launching operation, the winch 104 may be set to a freewheeling mode, allowing the winch strap 206 to unwind from the winch 104 when pulled towards the rear of the trailer 102. The trailer 102 and loaded watercraft 100 may be driven to a boat ramp by an associated towing vehicle and the trailer 102 may be backed into the water. When the buoyancy of the watercraft 100 reaches a certain amount (e.g., at a certain water depth), the watercraft 100 may slide from the trailer 102 along the support boards 302, 304 and/or other associated support structures (e.g., rollers). In some embodiments, the tension from the first and second guide straps 108, 200 may provide certain measure of force propelling the watercraft 100 from the mobile trailer 102 into the water.

Then watercraft 100 may travel backwards as the winch unwinds under the force generated by the first and second guide straps 108, 200 until the winch strap 206 reaches a terminal extended position and/or the first and second guide straps 108, 200 have contracted to a point at which they no longer provide a rearward force on the watercraft 100, as illustrated in connection with FIG. 3 and FIG. 4. In this semi-launched position, which also may be referred to herein in certain instances as a semi-loaded position, the watercraft 100 may float freely in the water but be held in place by the winch strap 206 and winch hook assembly 110. In various embodiments, a bow of the watercraft 100 may be in front of the rear connection points (e.g., rear connection points on the first and second guide posts 112, 300) when the watercraft 100 is in the semi-launched position.

Figure 14:
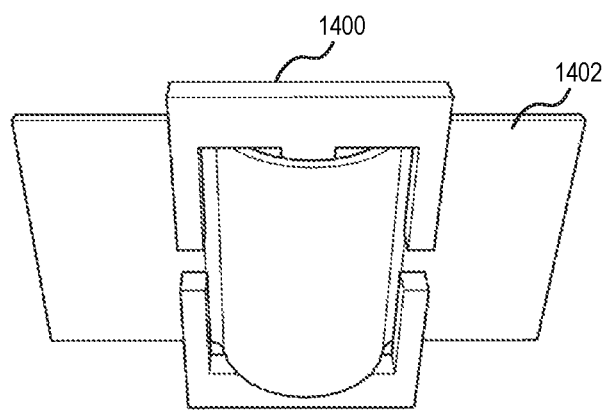
FIG. 14 illustrates an example of a winch strap adjustment apparatus consistent with certain embodiments of the present disclosure.

In some embodiments, the winch strap 206 may be sized and/or have its length customized such that a terminal extended position of the winch strap 206 corresponds with the semi-launched position. In further embodiments, a strap adjustment apparatus may be used to set a length that the winch strap 206 may extend from the winch 104. For example, as illustrated in FIG. 14, a strap adjustment apparatus 1400 consistent with various embodiments may comprise a split bi-bar and/or tri-bar device, which may comprise a metal, a durable plastic, and/or any other suitable material.

To install the strap adjustment apparatus 1400, the desired extended strap length from the winch may be determined based on the watercraft and/or trailer configuration. In certain embodiments, the extended strap length may be selected such that the watercraft remains between guide posts, rails, and/or rollers when in a semi-launched position. In some embodiments, this length may be between approximately five and fifteen feet from the winch.

The winch may be set to a freewheel mode and the strap may be extended to the desired length. The strap adjustment apparatus 1400 may be installed on the strap 1402 to secure a point at which the strap extends from the winch to a point on the wound portion of the strap around the winch mechanism, thereby forming a fixed loop around the winch mechanism. Once installed, the strap 1402 may thus not be extended past the desired extended length due to the fixed strap loop around the winch formed by the strap adjustment apparatus 1400. In other embodiments, the strap adjustment apparatus 1400 may be installed in a manner such that it physically contacts with a housing and/or other portion of the winch when the strap is extended at a desired length in a manner that prevents the strap from extending further.

By using a strap adjustment apparatus 1400 consistent with various disclosed embodiments, a winch strap that is longer than the terminal extended position corresponding to the semi-launched position may be customized such that it does not extend from the winch past this position in a manner that does not require permanent modification to the winch strap. It will be appreciated that a variety of strap adjustment mechanisms may be used in connection with the disclosed embodiments, which may have designs that vary based on whether the winch uses a strap (as illustrated), a rope, a cable, and/or a chain, and that any suitable strap adjustment apparatus 1400 may be used in connection with the disclosed embodiments.

Referring back to FIG. 3 and FIG. 4, in the semi-launched position, an operator may perform any final preparations such as, for example, engine starting, out drive lowering, and/or the like. When ready for final launching, the operator may manually detach the winch hook from the bow eye of the watercraft, allowing the watercraft 100 to float freely from the trailer 102. In further embodiments, the operator may manually detach the winch hook from the bow eye of the watercraft 100 prior to launching the watercraft 100, allowing the watercraft 100 to launch without being held in the semi-launched position. Once launched, the tow vehicle and/or trailer 102 may be driven away from the launching ramp. The aid system may remain installed with the winch strap 206 in an extended position ready for a subsequent loading operation. Alternatively, the aid system may be removed.

During a launching operation, if required, the winch strap 206 may be extended to the semi-loaded position and the aid system (e.g., the first and second guide straps 108, 200) may be installed. The tow vehicle and trailer 102 may be driven down the launch ramp and the trailer 102 may be backed into the water. In some embodiments, the position of the trailer 102 under the water may be similar to the position used during launching operations. In various embodiments, the guide posts 112, 300, rails, and/or rollers may provide a visual indication of the location of the trailer 102 under the water.

The operator may maneuver the watercraft 100 towards the trailer 102, centering the bow of the watercraft 100 in the direction of the winch hook assembly 110, which may be indicated visually through visual flags and/or floats as described above. In some circumstances, a wedge shape formed by the first and second guide straps 102, 200 and their associated elastic properties may operate to assist in aligning the watercraft 110 relative to the winch hook assembly 110 and/or the trailer 102. The operator may reach the winch hook of the winch hook assembly 110 from the watercraft 100 and secure the winch hook to the bow eye.

Once the winch hook is secured to the watercraft 100, the watercraft 100 may be secured in a semi-loaded position and held in position, at least in part, by the first and second guide straps 102, 200. Forward and/or side drafting of the watercraft 100 relative to the trailer may be counteracted by the tension of the first and second guide straps 102, 200, thereby aiding in keeping the watercraft 100 in position relative to the trailer 102. Final preparations for loading may be performed (e.g., turning of the engine, raising an out drive, etc.).

To load the watercraft 100 into a final position, the winch 104 may be cranked to retract the winch strap 106 and pull the watercraft 100 into a final loaded position on the trailer 102. The tow vehicle may then pull the trailer 102 and loaded watercraft 100 from the ramp to a preparation area where final preparations may be made for towing and final transport (e.g., further securing of the watercraft 100 to the trailer 102 and/or the like). If desired, the aid system may be detached from the trailer 102 during transport of the watercraft 100.

Although the foregoing has been described in some detail for purposes of clarity, it will be apparent that certain changes and modifications may be made without departing from the principles thereof. Although various embodiments of the disclosed launching and/or loading aid system are description in connection with a watercraft, it will be appreciated that in further embodiments, the disclosed aid system may be used in connection with a variety of other vehicles that may not necessarily be watercraft. For example, various embodiments of the aid system may be used in connection with loading and/or releasing from a trailer other types of vehicles including, without limitation, motorized personal recreational vehicles such as all-terrain vehicles, side-by-side vehicles, dune buggies, motorcycles, non-motorized vehicles such as bicycles, and/or other types of vehicles that may be secured during transport and/or storage via a strap and/or chain and/or an associated winching system. Further embodiments may be used in connection with applications that do not necessarily use a trailer, as may be the case in connection with securing a watercraft and/or vehicle to a truck bed, a dock, a berth, and/or another mooring and/or storage location.

It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A watercraft loading and unloading aid system, the system comprising:
   a first guide strap, the first guide strap comprising:
      a first end configured to removably attach to first rear connection point on a first side of a watercraft trailer,
      a second end configured to removably attach to a winch hook assembly of the watercraft trailer;
      wherein at least a first portion of the first guide strap comprises a first elastic material; and
   a second guide strap, the second guide strap comprising:
      a first end configured to removably attach to a second rear connection point on a second side of the watercraft trailer,
      a second end configured to removably attach the winch hook assembly of the watercraft trailer;
      wherein at least a first portion of the second guide strap comprises a second elastic material.

2. The system of claim 1, wherein the first elastic material and the second elastic material comprise the same type of elastic material.

3. The system of claim 1, wherein at least one of the first elastic material and the second elastic material comprise a rubber material.

4. The system of claim 3, wherein the rubber material comprises at least one of a solid rubber material, a stranded rubber material, and a tubular rubber material.

5. The system of claim 3, wherein the rubber material comprises a latex rubber material.

6. The system of claim 1, wherein at least one of the first elastic material and the second elastic material comprise a polymer material.

7. The system of claim 1, wherein at least one of the first elastic material and the second elastic material comprise a spring.

8. The system of claim 1, wherein the winch hook assembly comprises a winch strap loop and winch hook coupled to the winch strap loop and wherein:
the second end of the first guide strap comprises a first hook configured to removably attach to a portion of the winch hook; and
the second end of the second guide strap comprises a second hook configured to removably attach to the portion of the winch hook.

9. The system of claim 1, wherein the winch hook assembly comprises a winch strap loop and winch hook coupled to the winch strap loop and wherein:
the second end of the first guide strap comprises a first hook configured to removably attach to the winch strap loop; and
the second end of the second guide strap comprises a second hook configured to removably attach to the winch strap loop.

10. The system of claim 1, wherein the system further comprises a first sheath surrounding at least a second portion of the first guide strap.

11. The system of claim 10, wherein the at least a first portion of the first guide strap and the at least a second portion of the first guide strap overlap at least in part.

12. The system of claim 10, wherein a portion of the first sheath comprises a material having a higher a coefficient of friction than other portions of the first sheath.

13. The system of claim 10, wherein the system further comprises a second sheath surrounding at least a second portion of the second guide strap.

14. The system of claim 13, wherein the at least a first portion of the first guide strap and the at least a second portion of the second guide strap overlap at least in part.

15. The system of claim 13, wherein a portion of the second sheath comprises a material having a higher coefficient of friction than other portions of the second sheath.

16. The system of claim 1, wherein the first rear connection point comprises a first guide post on the first side of the watercraft trailer.

17. The system of claim 1, wherein the second rear connection point comprises a second guide post on the second side of the watercraft trailer.

18. The system of claim 1, wherein the first rear connection point comprises a first guide rail on the first side of the watercraft trailer.

19. The system of claim 1, wherein the second rear connection point comprises a second guide rail on the second side of the watercraft trailer.

20. The system of claim 1, wherein the first end of the first guide strap comprises a first rear attachment hook configured to removably attach to the first rear connection point and the first end of the second guide strap comprises a second rear attachment hook configured to removably attach to the second rear connection point.

21. The system of claim 1, wherein the first end of the first guide strap comprises a first cinching mechanism configured to removably attach to the first rear connection point and the first end of the second guide strap comprises a second cinching mechanism configured to removably attach to the second rear connection point.

22. The system of claim 1, wherein the winch hook assembly of the trailer comprises a winch strap loop and winch hook coupled to the winch strap loop and the system further comprises a secondary hook configured to removably attach to the winch strap loop, and wherein
the second end of the first guide strap comprises a first hook configured to removably attach to a connection point on the secondary hook; and
the second end of the second guide strap comprises a second hook configured to removably attach to the connection point on the secondary hook.

* * * * *